(12) United States Patent
Oyama (10) Patent No.: US 10,189,467 B2
(45) Date of Patent: Jan. 29, 2019

(54) CONTROL APPARATUS OF HYBRID VEHICLE

(71) Applicant: Toyota Jidosha Kabushiki Kaisha, Toyota-shi, Aichi-ken (JP)

(72) Inventor: Shunsuke Oyama, Nagakute (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 238 days.

(21) Appl. No.: 15/160,534

(22) Filed: May 20, 2016

(65) Prior Publication Data

US 2016/0347305 A1    Dec. 1, 2016

(30) Foreign Application Priority Data

May 29, 2015    (JP) .................................. 2015-109632

(51) Int. Cl.
*B60W 20/17*      (2016.01)
*B60L 15/20*      (2006.01)
(Continued)

(52) U.S. Cl.
CPC ............... *B60W 20/17* (2016.01); *B60K 6/24* (2013.01); *B60K 6/26* (2013.01); *B60K 6/445* (2013.01); *B60L 15/20* (2013.01); *B60W 10/08* (2013.01); *B60W 20/00* (2013.01); *B60W 2510/0685* (2013.01); *B60W 2710/083* (2013.01); *B60Y 2200/92* (2013.01); *B60Y 2300/205* (2013.01); *Y02T 10/6239* (2013.01);
(Continued)

(58) Field of Classification Search
None
See application file for complete search history.

(56) References Cited

U.S. PATENT DOCUMENTS

2008/0122391 A1    5/2008  Iwase et al.
2012/0029748 A1    2/2012  Kozarekar et al.
(Continued)

FOREIGN PATENT DOCUMENTS

JP    2008-143348 A    6/2008
JP    2013-203388 A    10/2013
WO    2014091582 A1    6/2014

OTHER PUBLICATIONS

Office Action dated Dec. 11, 2017 in U.S. Appl. No. 15/160,543, filed May 20, 2016; Inventor: Shunsuke Oyama.
(Continued)

*Primary Examiner* — Rami Khatib
*Assistant Examiner* — Gerrad A Foster
(74) *Attorney, Agent, or Firm* — Dinsmore & Shohl LLP (57) ABSTRACT

A control apparatus of a hybrid vehicle has an abnormal sound generation condition determination unit that determines whether or not a drive state of the hybrid vehicle satisfies an abnormal sound generation condition of a gear train, and a pressing processor that executes a pressing process to apply a pressing torque to suppress generation of abnormal sound from a first rotary electric machine to the gear train of a transmission mechanism when the abnormal sound generation condition is satisfied and to not apply the pressing torque when the abnormal sound generation condition is not satisfied. A pressing torque setting unit sets a pressing torque to be applied by the first rotary electric machine to a torque in a direction to suppress an engine cam torque that may rotate an engine output shaft during a period in which the engine is stopped.

8 Claims, 5 Drawing Sheets

(51) Int. Cl.
*B60K 6/24* (2007.10)
*B60K 6/26* (2007.10)
*B60K 6/445* (2007.10)
*B60W 10/08* (2006.01)
*B60W 20/00* (2016.01)

(52) U.S. Cl.
CPC ........ *Y02T 10/7258* (2013.01); *Y10S 903/905* (2013.01); *Y10S 903/906* (2013.01)

(56) References Cited

U.S. PATENT DOCUMENTS

| | | |
|---|---|---|
| 2013/0297180 A1 | 11/2013 | Ando et al. |
| 2015/0367832 A1 | 12/2015 | Oshiumi |
| 2016/0347306 A1 | 12/2016 | Oyama |

OTHER PUBLICATIONS

Notice of Allowance dated Jul. 18, 2018, in U.S. Appl. No. 15/160,543, filed May 20, 2016.

CONTROL APPARATUS OF HYBRID VEHICLE

PRIORITY INFORMATION

This application claims priority to Japanese Patent Application No. 2015-109632, filed on May 29, 2015, which is incorporated herein by reference in its entirety.

BACKGROUND

Technical Field

The present disclosure relates to a control apparatus of a hybrid vehicle, and in particular to a control apparatus of a hybrid vehicle that executes suppression of an abnormal sound of a gear train in a hybrid vehicle in which an engine, a first rotary electric machine, and a second rotary electric machine are connected to each other through a transmission mechanism having the gear train.

Related Art

As a technique related to the present disclosure, US Patent Application Publication No. 2012/0029748 discloses that, in a hybrid vehicle having an engine, a power generator, and a motor, when the engine is stopped and the vehicle travels solely using the motor, as the vehicle velocity becomes high, a rotational speed becomes high in a no-load state of the power generator, resulting in degradation of a pinion of a planetary gear mechanism which is a motive power conversion mechanism. Here, a small torque in a degree constituted by a frictional torque of the engine is supplied from the power generator to the pinion of the planetary gear mechanism.

In a hybrid vehicle in which an engine, a first rotary electric machine, and a second rotary electric machine are connected to each other through a transmission mechanism including a gear train, if there is rattling in the gear train, depending on the drive state of the hybrid vehicle, rattling noise or the like may occur in the gear train, which is an abnormal sound uncomfortable for the user. As described in US Patent Application Publication No. 2012/0029748, when a pressing torque is applied from the first rotary electric machine, which is a power generator, to the gear train during a period when the engine is stopped, the rattling of the gear train is reduced, and generation of the abnormal sound during the period when the engine is stopped can be suppressed. In this case, depending on the manner of application of the pressing torque, a crank angle of the engine which is being stopped may be moved. Because the crank angle of the engine is strongly correlated to a shock at the time of starting of the engine, when the crank angle of the engine is moved, the shock during starting of the engine may be worsened.

SUMMARY

An advantage of the present disclosure is in the provision of a control apparatus of a hybrid vehicle which can suppress movement of the crank angle of the engine while suppressing generation of an abnormal sound in the gear train.

According to one aspect of the present disclosure, there is provided a control apparatus of a hybrid vehicle in which an engine, a first rotary electric machine, and a second rotary electric machine are connected to each other through a transmission mechanism including a gear train, the control apparatus configured to: determine whether or not a drive state of the hybrid vehicle satisfies an abnormal sound generation condition of the gear train, and execute a pressing process to apply a pressing torque for reducing rattling from the first rotary electric machine to the gear train of the transmission mechanism when the abnormal sound generation condition is satisfied and to not apply the pressing torque when the abnormal sound generation condition is not satisfied, wherein the pressing torque applied by the first rotary electric machine is a torque in a direction to suppress an engine cam torque which may rotate an engine output shaft during a period in which the engine is stopped.

According to another aspect of the present disclosure, in the control apparatus of the hybrid vehicle, a relationship between a crank angle of the engine and a direction of the engine cam torque is determined and stored in advance, a pressing torque in a direction to rotate the engine output shaft in a negative rotation direction is applied when the crank angle during the period in which the engine is stopped is in an angle range where the engine output shaft tends to be more easily rotated in a positive rotation direction by the engine cam torque, and a pressing torque in a direction to rotate the engine output shaft in the positive rotation direction is applied when the crank angle during the period in which the engine is stopped is in an angle range where the engine output shaft tends to be more easily rotated in the negative rotation direction by the engine cam torque.

According to another aspect of the present disclosure, in the control apparatus of the hybrid vehicle, the pressing torque in the direction to rotate the engine output shaft in the positive rotation direction is applied regardless of the crank angle of the engine when an elapsed time from a time when the abnormal sound generation condition is satisfied is within a predetermined value.

According to another aspect of the present disclosure, in the control apparatus of the hybrid vehicle, the abnormal sound generation condition includes: a condition that a drive mode is an EV mode in which the engine is stopped and the vehicle travels solely using the second rotary electric machine; a condition that a vehicle velocity of the hybrid vehicle is lower than or equal to a predetermined velocity; a condition that the hybrid vehicle is traveling and is not stopped; and a condition that a shift position is such that a torque is output to a drive wheel.

According to another aspect of the present disclosure, in the control apparatus of the hybrid vehicle, the vehicle velocity lower than or equal to a predetermined velocity is a vehicle velocity lower than or equal to a predetermined acceleration velocity when the hybrid vehicle is accelerating, and is a vehicle velocity lower than or equal to a predetermined deceleration velocity which is lower than the predetermined acceleration velocity when the hybrid vehicle is decelerating.

According to the control apparatus of hybrid vehicle of some aspects of the present disclosure, when the drive state of the hybrid vehicle satisfies the abnormal sound generation condition of the gear train, a pressing torque in a direction to suppress the engine cam torque which may rotate the engine output shaft during a period in which the engine is stopped is applied from the first rotary electric machine to the gear train of the transmission mechanism.

The crank angle moves during the period in which the engine is stopped because an external force greater than the frictional torque of the engine is applied. According to the above-described configuration, because the pressing torque is applied from the first rotary electric machine in a direction to suppress the engine cam torque which is a cause of the external force, the external force applied to the engine output shaft can be reduced, and the movement of the crank angle of the engine can be suppressed while suppressing generation of the abnormal sound of the gear train.

According to the control apparatus of the hybrid vehicle of some aspects of the present disclosure, a pressing torque in a direction to rotate the engine output shaft in the negative rotation direction is applied when the crank angle during the period in which the engine is stopped is in an angle range where the engine output shaft tends to be more easily rotated in the positive rotation direction, and a pressing torque in a direction to rotate the engine output shaft in the positive rotation direction is applied when the crank angle is in an angle range where the engine output shaft tends to be more easily rotated in the negative rotation direction. With such a configuration, the external force applied to the engine output shaft can be reduced according to the crank angle during the period in which the engine is stopped, and the movement of the crank angle of the engine can be suppressed while suppressing generation of the abnormal sound of the gear train.

For example, in a period immediately after a stopping process of the engine or the like, in addition to the crank cam torque, there still remains a compression reaction force of the engine and a flywheel damper twist reaction force, or the like, and the engine output shaft tends to reversely rotate. According to the control apparatus of the hybrid vehicle of some aspects of the present disclosure, when the elapsed time from the time when the abnormal sound generation condition is satisfied is within a predetermined value which is defined in advance, a pressing torque in a direction to rotate the engine output shaft in the positive rotation direction may be applied regardless of the crank angle of the engine. With such a configuration, the movement of the crank angle of the engine can be suppressed while suppressing generation of the abnormal sound of the gear train.

In the control apparatus of the hybrid vehicle according to some aspects of the present disclosure, the abnormal sound generation condition may include a condition that the drive mode is the EV mode in which the engine is stopped and the vehicle travels solely using the second rotary electric machine, and a condition that the vehicle velocity of the hybrid vehicle is lower than or equal to a predetermined velocity. During the time when the engine is operating, an engine sound is relatively loud, and even if there is generation of abnormal sound in the gear train, the user is not too disturbed. In addition, when the vehicle velocity is relatively high in the EV mode, a sun gear to which the first rotary electric machine is connected rotates at a high speed. Thus, even if the abnormal sound is generated in the gear train, the engine output shaft is not moved in a certain direction. Based on these factors, as the abnormal sound generation conditions that would disturb the user, conditions are that the vehicle is in the EV mode and in a low velocity where the vehicle velocity is lower than or equal to a predetermined velocity.

The abnormal sound generation conditions may further include a condition that the hybrid vehicle is traveling and is not stopped, and a condition that a shift position is at a shift position in which the torque is output to the drive wheel. In order for the first rotary electric machine to generate the pressing torque, torque generation of the first rotary electric machine is necessary, and the fuel consumption is worsened correspondingly. When the hybrid vehicle is stopped and does not generate torque, it can be considered that the possibility of generation of the abnormal sound of the gear train is low. According to the above-described configuration, the movement of the crank angle of the engine can be suppressed while avoiding the worsening of the fuel consumption and suppressing the generation of the abnormal sound of the gear train.

According to the control apparatus of the hybrid vehicle of some aspects of the present disclosure, the vehicle velocity lower than or equal to the predetermined velocity may be a vehicle velocity lower than or equal to a predetermined acceleration velocity when the hybrid vehicle is accelerating, and a vehicle velocity lower than or equal to a predetermined deceleration velocity lower than the predetermined acceleration velocity when the hybrid vehicle is decelerating. By setting such a hysteresis characteristic, it becomes possible to stably execute the low-velocity determination to determine whether or not the vehicle velocity is lower than or equal to the predetermined velocity.

DETAILED DESCRIPTION

Embodiments of the present disclosure will now be described in detail with reference to the drawings. In the following description, a hybrid vehicle having an engine and two rotary electric machines is described as the hybrid vehicle, but this description is merely exemplary of a basic structure of the hybrid vehicle, and alternatively, the number of rotary electric machines may be 3 or more. A four-cylinder type engine will be described as the engine, but this description is merely exemplary, and alternatively, an engine having a different number of cylinders may be used. In the following, a structure which uses a planetary gear mechanism as a motive power distribution mechanism is described, but this configuration is merely exemplary, and alternatively, a motive power distribution mechanism of a type other than the planetary gear mechanism may be used. Further, in the following, a multiple-axis type drive source in which a second rotary electric machine is placed on an different axis from that for the engine and a first rotary electric machine is described, but this is merely exemplary for description of control using a pressing torque of the second rotary electric machine for reducing rattling of the gear train, and in some cases, the drive source may be a single-axis type drive source.

In the following description, elements similar over all of the drawings are assigned the same reference numerals, and will not be repeatedly described.

Figure 1:
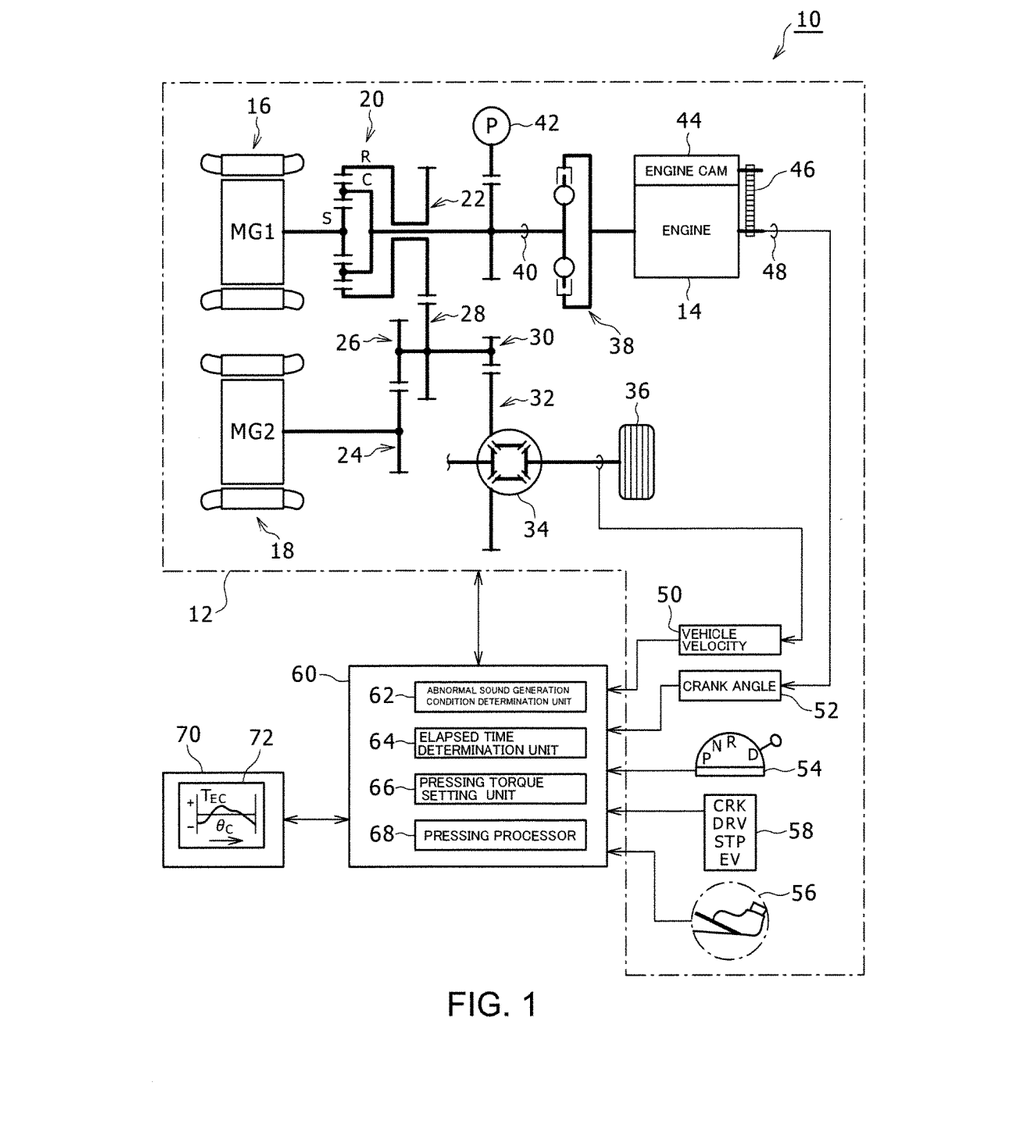
FIG. 1 is a structural diagram of a hybrid vehicle including a control apparatus according to an embodiment of the present disclosure.
Figure 2:
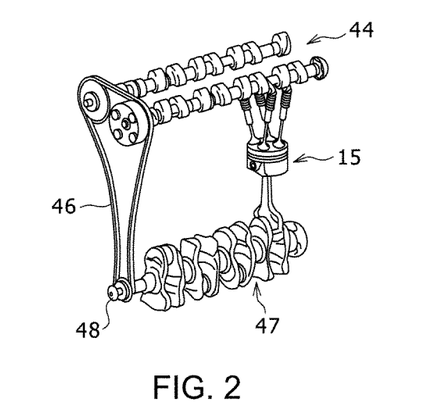
FIG. 2 is a structural diagram related to a crank shaft and an engine cam mechanism.

FIG. 1 is a diagram showing a structure of a hybrid vehicle 10. FIG. 2 is a structural diagram related to a crank shaft and an engine cam mechanism. As shown in FIG. 1, the hybrid vehicle 10 includes a vehicle body 12 and a control apparatus 60.

The vehicle body 12 has, as drive sources, an engine 14, a first rotary electric machine 16 shown as MG1, and a second rotary electric machine 18 shown as MG2. The vehicle body 12 further has a motive power distribution mechanism 20 for distributing energy among these elements, a train of a plurality of gears 22, 24, 26, 28, 30, and 32 serving as a motive power transmitting mechanism, and a differential gear mechanism 34. The differential gear mechanism 34 is connected to a drive wheel 36. The drive wheels 36 are left and right wheels, but in FIG. 1, one of the drive wheels is not shown. A drive circuit including an inverter and an electricity storage apparatus are connected to the first rotary electric machine 16 and the second rotary electric machine 18, but these elements are not shown in FIG. 1. The engine 14 is an internal combustion engine forming the drive source of the hybrid vehicle 10. The engine 14 is formed from a piston/cylinder mechanism of 4 cylinders. Each cylinder structure has a cylinder having a tubular inner space, a piston 15 shown in FIG. 2 which slides along an inner wall of the cylinder, a fuel injection valve for injecting gasoline which is the fuel into the inside of the cylinder, an ignition plug which ignites compressed mixture gas of gasoline and air, an intake pipe for supplying air to the inside of the cylinder, and an exhaust pipe for exhausting exhaust gas from the inside of the cylinder to the outside.

The engine 14 supplies mixture gas of gasoline and air into the cylinder by control of the fuel injection valve and the intake valve, and repeats upward pressing of the piston 15, ignition of the mixture gas, explosion and expansion of the mixture gas, and downward pressing of the piston. With such a configuration, as shown in FIG. 2, a crank shaft 48 serving as a motive power shaft connected to the piston 15 is rotated and a torque is generated.

Operations of the fuel injection valve, the intake valve, the exhaust valve, or the like are correlated to a rotational operation of the crank shaft 48. For this purpose, as shown in FIG. 2, an engine cam mechanism 44 is provided adjacent to the engine 14. The crank shaft 48 is a shaft in which four crank mechanisms 47 are provided corresponding to pistons 15 of the 4-cylinder engine. A timing belt 46 is suspended between the crank shaft 48 and the engine cam mechanism 44, and with this configuration, the engine cam mechanism 44 operates in correlation to the rotational operation of the crank shaft 48.

Figure 3:
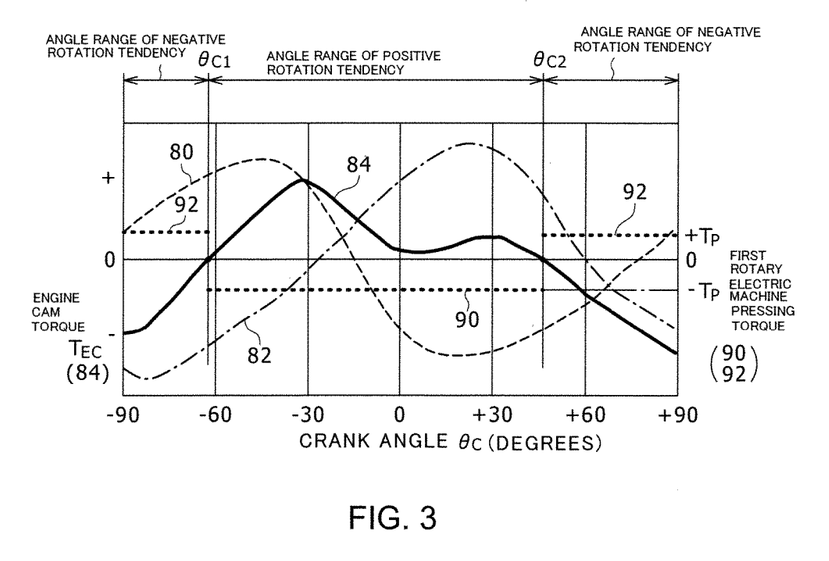
FIG. 3 is a diagram showing a relationship of an engine cam torque with respect to a crank angle, used in a control apparatus of a hybrid vehicle according to an embodiment of the present disclosure.

FIG. 3 is a diagram showing a relationship between an engine cam torque $T_{EC}$ applied by the engine cam mechanism 44 to the crank shaft 48 and the crank angle $\theta_C$, in a stopped state of the engine 14. The horizontal axis represents a periodic rotational angle for each cylinder of the crank shaft 48. As the engine 14 is a 4-cylinder engine, the crank shaft 48 has one period corresponding to 4 cylinders with a rotational angle of 720 degrees, and has a periodic rotational angle of ±90 degrees for each cylinder. The vertical axis represents the magnitude of the engine cam torque $T_{EC}$. The engine cam torque $T_{EC}$ is given by a combined cam torque 84 in which a cam torque 80 on the exhaust valve side and a cam torque 82 on the intake valve side are combined.

The engine cam torque $T_{EC}$ acts as an external force with respect to the rotation of the crank shaft 48. If a direction in which the crank shaft 48 tends to be more easily rotated when the engine cam torque $T_{EC}$ has a positive value is called a direction of positive rotation, the crank shaft 48 tends to be more easily rotated in a direction of a negative rotation when the engine cam torque $T_{EC}$ has a negative value.

In FIG. 3, in a region of the crank angle $\theta_C$ of $\theta_{C1}$ to $\theta_{C2}$, the combined cam torque 84 has a positive value. In this range of the crank angle, the crank shaft 48 and the engine output shaft 40 tend to be more easily rotated in the direction of positive rotation direction, and thus, this range of the crank angle will hereinafter be referred to as "angle range of positive rotation direction tendency" and a range of the crank angle other than this range will be referred to as "angle range of negative rotation direction tendency". In the example configuration of FIG. 3, the region of the crank angle $\theta_C$ from $\theta_{C1}$ to $\theta_{C2}$ is the "angle range of positive rotation direction tendency", and a region of the crank angle of −90 degrees to $\theta_{C1}$ and a region of the crank angle from $\theta_{c2}$ to +90 degrees are the "angle ranges of negative rotation direction tendency".

A thick broken line shown in FIG. 3 represents a pressing torque applied by the first rotary electric machine 16 to the gear train. In the angle range of positive rotation direction tendency, $-T_P$ is applied as a pressing torque 90 on the negative rotation direction from the first rotary electric machine 16 to the gear train, and, in the angle range of negative rotation direction tendency, $+T_P$ is applied as a pressing torque 92 on the positive rotation direction from the first rotary electric machine 16 to the gear train. With such a configuration, generation of abnormal sound in the gear train caused by the engine cam torque is suppressed. Details will be described later with reference to FIGS. 7A-7E or the like.

Referring again to FIG. 1, the two rotary electric machines 16 and 18 constituting the drive sources are both motor generators (MGs) equipped on the hybrid vehicle 10, and are three-phase synchronous rotary electric machines which function as a motor when electric power is supplied from a drive circuit (not shown) and which have a power generation function when the vehicle is driven by the engine 14 or during braking of the hybrid vehicle 10. If the two rotary electric machines 16 and 18 are distinguished as the first rotary electric machine 16 and the second rotary electric machine 18, the first rotary electric machine 16 primarily functions as a power generator driven by the engine 14, and the second rotary electric machine 18 primarily functions as a motor that drives the drive wheel 36.

The motive power distribution mechanism 20 provided between the engine 14 and the two rotary electric machines 16 and 18 is a mechanism having a function to suitably distribute a portion used for power generation and a portion for driving the drive wheel 36, between the output of the engine 14, the input/output of the first rotary electric machine 16, and the output of the second rotary electric machine 18, according to a traveling state of the hybrid vehicle 10. The motive power distribution mechanism 20 is a planetary gear mechanism having a sun gear shown by S which is an outer-tooth gear, a ring gear shown by R which is an inner-tooth gear placed coaxially with the sun gear, a pinion gear which engages the sun gear and also engages the ring gear, and a carrier shown by C which rotatably and revolvably holds the pinion gear, and which executes a differential operation using the sun gear, the ring gear, and the carrier as rotation elements.

The crank shaft 48 of the engine 14 is connected to the ring gear as the engine output shaft 40 through a flywheel damper 38. An output shaft of the first rotary electric machine 16 is connected to the sun gear S. An output shaft of the second rotary electric machine 18 is connected to the ring gear R through an output gear 24, a reduction gear 26, a counter driven gear 28, and a counter drive gear 22. In addition, the output shaft of the second rotary electric machine 18 is connected to the drive wheel 36 through the output gear 24, the reduction gear 26, a drive pinion gear 30, a differential ring gear 32, and the differential gear mechanism 34. These gears form the train of gears (gear train) 22, 24, 26, 28, 30, and 32. The output shaft 40 of the engine 14 and the output shaft of the first rotary electric machine 16 are coaxially placed. The output shaft of the second rotary electric machine 18 is placed on a different axis to that axis of the engine 14 and the first rotary electric machine 16. Such a method of placement is referred to as a multiple-axis type.

An oil pump 42 connected to the engine output shaft 40 is a pump that circulates and supplies lubricant oil to each of the engine 14, the first rotary electric machine 16, the second rotary electric machine 18, the plurality of the gears of the gear train 22, 24, 26, 28, 30, and 32, and the differential gear mechanism 34.

A rotational speed of the drive wheel 36 is detected by a suitable vehicle velocity detection means, and is transmitted to the control apparatus 60 as a vehicle velocity 50 through a signal line. A rotational position of the crank shaft 48 is detected by a suitable crank angle detection means, and is transmitted to the control apparatus 60 as a crank angle 52 through a signal line.

A shift lever 54 provided in a cabin room of the hybrid vehicle 10 is an operator for changing a shift position by a manipulation of the user. As the shift position, there are shown a drive position shown with D, a reverse position shown with R, a neutral position shown with N, and a parking position shown with P. Of these shift positions, in the neutral position, no torque is output from the drive source. A state of the shift position of the shift lever 54 is transmitted to the control apparatus 60 through a signal line.

The brake 56 is an operator to stop rotation of the drive wheel 36 by a step-in manipulation of the user. A manipulation state of the brake 56 is transmitted to the control apparatus 60 through a signal line. In addition to the above, in the vehicle interior, a steering wheel, an accelerator, or the like are also placed, but these elements are not shown in FIG. 1.

A drive mode 58 in the hybrid vehicle 10 include a total of 4 modes, including three modes related to operation of the engine 14, that is, a cranking mode shown by CRK, an engine travel mode shown by DRV, an engine stop process mode shown with STP, and an EV mode in which the engine 14 is stopped and the vehicle travels by driving the drive wheel 36 solely using the second rotary electric machine 18. One of four mode identification flags CRK, DRV, STP, and EV is transmitted to the control apparatus 60, and the control apparatus 60 identifies the drive mode according to the transmitted mode identification flag.

The control apparatus 60 controls overall operation of the elements of the hybrid vehicle 10. The control apparatus 60 controls operations of the engine 14, the first rotary electric machine 16, the second rotary electric machine 18, the motive power distribution mechanism 20, or the like according to a travel state of the hybrid vehicle 10. Here, in particular, the control apparatus 60 executes control to suppress movement of the crank angle of the engine while suppressing generation of abnormal sound of the gear train. The control apparatus 60 may be formed from a computer suited to being equipped on a vehicle.

The control apparatus 60 includes an abnormal sound generation condition determination unit 62, an elapsed time determination unit 64 which determines whether or not an elapsed time from a time when the abnormal sound generation condition is satisfied exceeds a predetermined value, a pressing torque setting unit 66 which sets a direction of a pressing torque, and a pressing processor 68 which executes a pressing process according to the contents of the setting. These functions may be realized by executing software in the control apparatus 60. Specifically, the functions are realized by the control apparatus 60 executing an abnormal sound generation suppression program. Alternatively, some of the above-described functions may be realized by hardware.

A storage apparatus 70 is connected to the control apparatus 60 in a manner to allow communication, and is a memory which stores various programs including the abnormal sound generation suppression program executed by the control apparatus 60, temporary data, or the like. In addition, a cam torque relationship file 72 showing a relationship between the engine cam torque $T_{EC}$ and the crank angle $\theta_C$ described above with reference to FIG. 3 is also stored in the storage apparatus 70.

Figure 4:
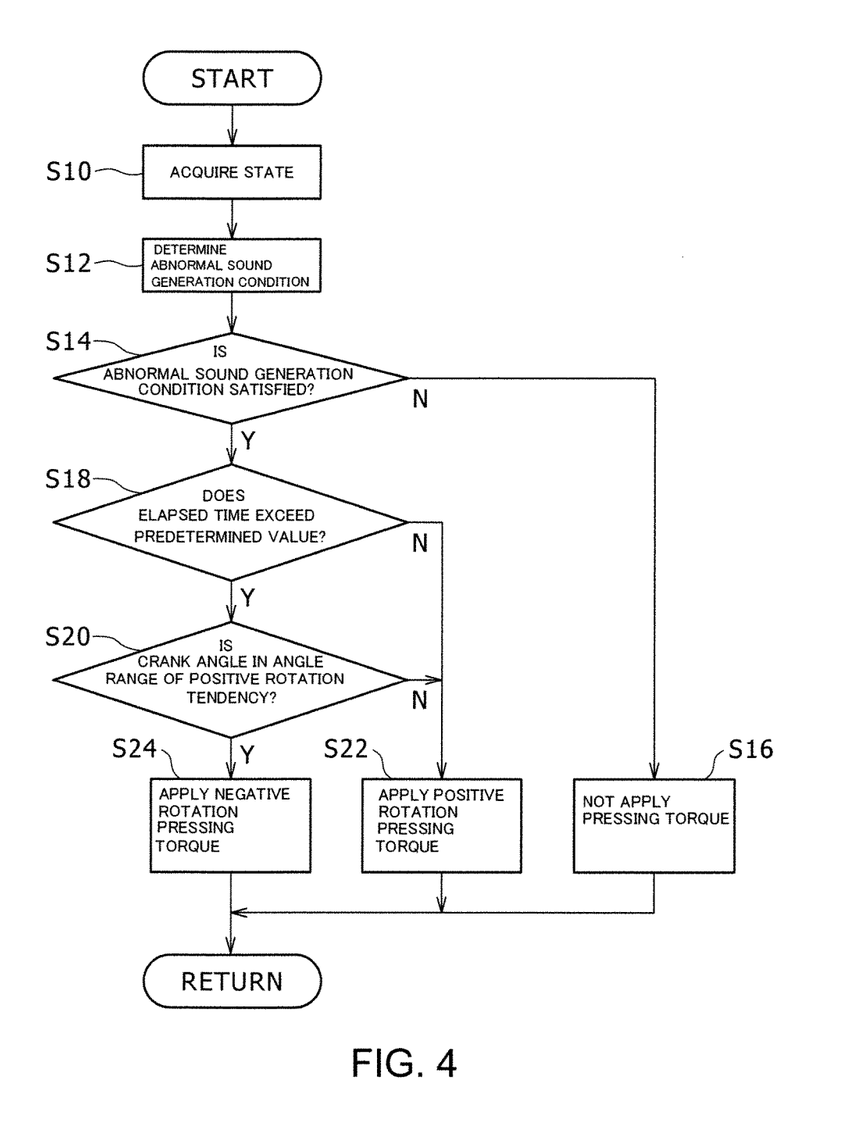
FIG. 4 is a flowchart showing a procedure for suppressing movement of a crank angle while suppressing generation of abnormal sound in a control apparatus of a hybrid vehicle according to an embodiment of the present disclosure.

An operation of such a structure, in particular, the details of the functions of the control apparatus 60, will now be described in detail with reference to FIG. 4 and subsequent diagrams. FIG. 4 is a flowchart showing a procedure for suppressing movement of the crank angle while suppressing the generation of the abnormal sound. Each step corresponds to each processing step of the abnormal sound generation suppression program.

When the hybrid vehicle 10 is started up, the elements are initialized, and the abnormal sound generation suppression program is started up in the control apparatus 60. States of the elements are acquired (S10). The acquired states include the vehicle velocity 50, the crank angle 52, the shift position of the shift lever 54, the manipulation state of the brake 56, the drive mode 58, measured time data of various timers to be described later, or the like, described above as information transmitted to the control apparatus 60 with reference to FIG. 1.

After the states are acquired, an abnormal sound generation condition determination is executed based on the acquired states (S12). The processing step is executed by the function of the abnormal sound generation condition determination unit 62 of the control apparatus 60. The abnormal sound generation condition determination is executed based on determinations of four states.

A first state determination is determination of whether or not the hybrid vehicle 10 is traveling. When the vehicle is not traveling, the vehicle is stopped. Thus, as the first state determination, it is determined whether the hybrid vehicle 10 is traveling or stopped. When it is determined as a result of the abnormal sound generation condition determination that the abnormal sound determination condition is satisfied, as will be described later, a pressing torque for reducing rattling of the gear train is output from the first rotary electric machine 16. When the torque is generated, the fuel consumption characteristic is correspondingly worsened. When the hybrid vehicle 10 is stopped and does not generate a torque, it can be considered that the possibility of generation of the abnormal sound of the gear train is also low, and thus, this condition may be excluded from the abnormal sound generation condition. When the result of the first state determination is negative and the hybrid vehicle 10 is stopped, it is determined that the abnormal sound generation condition is not satisfied.

Figure 5A:
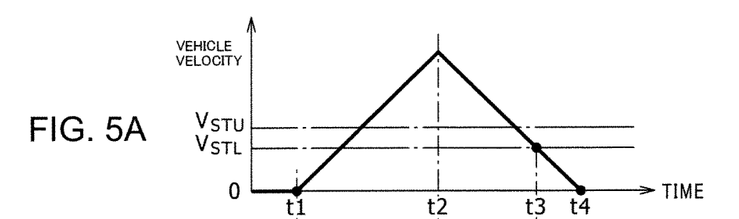
FIG. 5A is a diagram showing, with regard to an abnormal sound generation condition, contents of determination of a state of traveling and not stopped in a control apparatus of a hybrid vehicle according to an embodiment of the present disclosure, and showing a change with respect to time of a vehicle velocity.
Figure 5B:
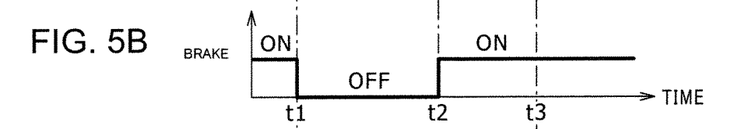
FIG. 5B is a diagram showing, with regard to an abnormal sound generation condition, contents of determination of a state of traveling and not stopped in a control apparatus of a hybrid vehicle according to an embodiment of the present disclosure, and showing elapsed time of brake manipulation.
Figure 5C:
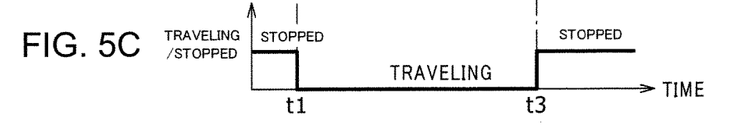
FIG. 5C is a diagram showing, with regard to an abnormal sound generation condition, contents of determination of a state of traveling and not stopped, and distinguishing the traveling and stopped states.

The determination of whether the hybrid vehicle 10 is traveling or stopped can be made by determining whether or not the brake 56 is depressed. However, when the depressing of the brake 56 is released because the vehicle has stopped, there may be a case where the vehicle starts to travel. An example of such a case is a case where the hybrid vehicle 10 is on a downhill road. FIGS. 5A-5C are diagrams showing the contents of determination of whether the vehicle is "traveling" or "stopped" in such a case. Horizontal axes of FIGS. 5A-5C represent time, a vertical axis of FIG. 5A represents a data value of the vehicle velocity 50, a vertical axis of FIG. 5B represents the state of the brake 56 with the depression of the brake as ON and the release of the brake as OFF, and a vertical axis of FIG. 5C represents a traveling state or a stopped state.

Up to time t1, the brake 56 is in the ON state and the vehicle velocity is 0, and the state of the hybrid vehicle 10 is "stopped". When the brake 56 is set to the OFF state at time t1, for example, on a downhill road or the like, the vehicle velocity starts to be increased, and thus, the hybrid vehicle 10 is set to "traveling", and not "stopped". At time t2, the user notices that the vehicle has started to travel, and sets the brake 56 to the ON state again. The vehicle velocity is reduced from time t2, but at time t3 prior to time t4 where vehicle velocity becomes 0, and when the vehicle velocity is reduced to a stop determination vehicle velocity $V_{STL}$ which is defined in advance, the state is changed from "traveling" to "stopped". In this example configuration, the state of the hybrid vehicle 10 is "traveling" between time t1 and time t3, and is "stopped" for other periods. In this manner, the period when the state is determined as "traveling" when the hybrid vehicle 10 moves by itself is longer than a release period of the brake 56 and shorter than a period in which the vehicle velocity is not 0. With such a configuration, the condition of "traveling" as the abnormal sound generation condition can be suitably set. $V_{STU}$ in FIG. 5 is a vehicle velocity at which, after the vehicle velocity has increased upon release of the brake, the vehicle is clearly determined as traveling. The predefined stop determination vehicle velocity $V_{STL}$ is a vehicle velocity at which, after the vehicle velocity is reduced, the state is determined as stopped. The stop determination vehicle velocity $V_{STL}$, is lower than $V_{STU}$.

When the first state determination results in positive, a second state determination is executed for the abnormal sound generation condition. The second state determination is a determination of whether or not the hybrid vehicle 10 is in a torque generating state. When it is determined as a result of the abnormal sound generation condition determination that the abnormal sound generation condition is satisfied, a pressing torque for reducing rattling in the gear train is output from the first rotary electric machine 16. When the hybrid vehicle 10 is not in the torque generating state, the first rotary electric machine 16 cannot output the pressing torque. In consideration of this, the time when the vehicle is not in the torque generating state may be excluded from the abnormal sound generation condition. In the hybrid vehicle 10, when the shift position is in the neutral position, no torque is generated. When the shift position is at other shift positions, the torque can be generated. Therefore, when the shift position is at the neutral position, the second state determination results in negative, and it is determined that the abnormal sound generation condition is not satisfied.

When both the first state determination and the second state determination result in positive, a third state determination is executed for the abnormal sound generation condition. The third state determination is a determination of whether or not the drive mode of the hybrid vehicle 10 is the EV mode. As described above with reference to FIG. 1, of the drive modes, the CRK, the DRV, and the STP are drive modes related to the engine 14, and the EV mode is a drive mode in which the engine 14 is stopped and the hybrid vehicle 10 travels solely using the second rotary electric machine 18. When the hybrid vehicle 10 travels with the engine 14, the abnormal sound of the gear train is not too much disturbing for the user because of the noise of the engine 14. Therefore, when the engine 14 is operating, the third state determination results in negative, and it is determined that the abnormal sound generation condition is not satisfied.

When all of the first through third state determinations result in positive, a fourth state determination is executed for the abnormal sound generation condition. The fourth state determination is a determination of whether or not the vehicle velocity of the hybrid vehicle 10 is low, and is lower than or equal to a predetermined velocity. When the vehicle velocity is high in the EV mode, the sun gear S to which the first rotary electric machine 16 is connected rotates at a high speed. Thus, even if the abnormal sound is generated in the gear train, the engine output shaft 40 does not rotate in a certain direction. When the sun gear is at a low speed, the sun gear slowly presses the gear train, and thus the engine output shaft 40 is rotated and the crank angle of the crank shaft 48 may consequently be moved. Based on this, when the vehicle velocity of the hybrid vehicle 10 exceeds the predetermined velocity and is traveling at high velocity, the fourth state determination results in negative, and it is determined that the abnormal sound generation condition is not satisfied. The predetermined velocity may be determined based on a vehicle velocity corresponding to a rotation number of the sun gear Sat which the sun gear S presses and displaces the gear train.

Figure 6:
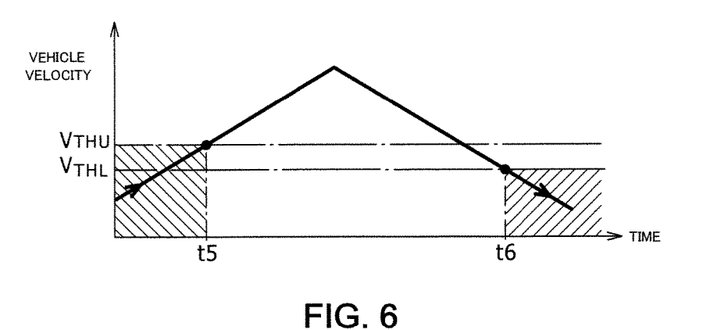
FIG. 6 is a diagram showing, with regard to an abnormal sound generation condition, contents of low velocity of lower than or equal to a predetermined velocity in a control apparatus of a hybrid vehicle according to an embodiment of the present disclosure.

The predetermined velocity used for the low velocity determination may have a hysteresis characteristic having different values between a case where the vehicle velocity is being increased (acceleration) and a case where the vehicle velocity is being reduced (deceleration). FIG. 6 shows the low velocity states of lower than or equal to a predetermined velocity when the hybrid vehicle 10 is accelerating and when the hybrid vehicle 10 is decelerating. The horizontal axis represents time and the vertical axis represents the vehicle velocity. The vehicle velocity is a data value of the vehicle velocity 50 transmitted from the vehicle velocity detection means described above with reference to FIG. 1. $V_{THU}$ on the vertical axis represents a predetermined acceleration velocity at the time of acceleration, and $V_{THL}$ represents a predetermined deceleration velocity at the time of deceleration. The velocities are in a relationship of $V_{THL} < V_{THU}$. In FIG. 6, when the hybrid vehicle 10 is accelerated and the velocity becomes greater than or equal to the predetermined acceleration velocity $V_{THU}$ at time t5, and the hybrid vehicle 10 is further accelerated to the maximum velocity and then decelerated and the velocity becomes lower than or equal to the predetermined deceleration velocity $V_{THL}$ at time t6, time regions shown with slanted lines before time t5 and after t6 are the low-velocity region of lower than or equal to the predetermined velocity. In this manner, by providing a hysteresis characteristic to the predetermined velocity used for determination of the low velocity, it is possible to accurately determine the fourth state.

When all of the four state determinations are positive, it is determined that the abnormal sound generation condition is satisfied. When any one of the four state determinations results in negative, it is determined that the abnormal sound generation condition is not satisfied. In the above description, the state determinations are executed in the order of first, second, third, and fourth state determinations. Alternatively, the order of determinations may be changed. Alternatively, the four states forming the abnormal sound generation condition may be acquired in the state acquisition of S10 of FIG. 4, and then the determination of whether or not the abnormal sound generation condition is satisfied may be executed based on an AND logic table.

The abnormal sound generation condition determination of S12 has been described. With reference again to FIG. 4, when the abnormal sound generation condition determination is completed, it is determined whether or not the abnormal sound generation condition is satisfied as a result of the determination (S14). When the determination of S14 is negative and the abnormal sound generation condition is not satisfied, the pressing torque is not applied from the first rotary electric machine 16 to the gear train (S16). The pressing torque is applied for suppressing the abnormal sound generation of the gear train, and thus, when the abnormal sound generation condition is not satisfied, it is not necessary to apply the pressing torque, and the pressing torque is set to 0 (Nm).

When the determination of S14 is positive and the abnormal sound generation condition is satisfied, the pressing torque is applied from the first rotary electric machine 16 to the gear train. The setting of the pressing torque to be applied differs depending on the state of the hybrid vehicle 10. In FIG. 4, the state of the hybrid vehicle 10 is classified into 3 different categories, and different setting of the pressing torque is executed for each of the categories.

When the determination of S14 is positive, an elapsed time from the time when the engine 14 is stopped and the drive mode is set to the EV mode is measured by an elapsed time timer. Then, it is determined whether or not the elapsed time measured by the elapsed time timer exceeds a predetermined value which is defined in advance (S18). As described above with reference to FIG. 3, the engine cam torque $T_{EC}$ changes depending on the crank angle $\theta_C$, and when the crank angle $\theta_C$ is in the angle range of the positive rotation direction tendency, the engine output shaft 40 tends to be more easily rotated in the positive rotation direction. On the contrary, when the crank angle $\theta_C$ is in the angle range of the negative rotation direction tendency, the engine output shaft 40 tends to be more easily rotated in the negative rotation direction. This state corresponds to a state where the engine 14 is stopped and the engine output shaft 40 is stopped in an approximately stable state. On the other hand, at times such as immediately after the stopping process of the engine 14, a compression reaction force of the engine 14, a twist reaction force of the flywheel damper 38, or the like still remains, in addition to the crank cam torque, and the engine output shaft 40 tends to be reversely rotated.

A determination S18 results in negative until elapsed time from the time when the engine 14 is stopped and the drive state is set to the EV mode exceeds a predetermined value $t_{EV0}$ which is defined in advance. The predetermined value $t_{EV0}$ can be set according to the capabilities of the engine 14 and the flywheel damper 38. As an example, $t_{EV0}$ is few seconds. When the determination of S18 results in negative, the elapsed time is within the predetermined value $t_{EV0}$. Therefore, a pressing torque in the positive rotation direction is applied from the first rotary electric machine 16 to the gear train, to suppress the reverse rotation of the engine output shaft 40 (S22). These processing steps are executed by functions of the elapsed time determination unit 64 and the pressing torque setting unit 66 of the control apparatus 60.

When the elapsed time from the time when the engine 14 is stopped and the drive state is set to the EV mode exceeds the predetermined value $t_{EV0}$ which is defined in advance, the determination in S18 results in positive. At this time, the engine 14 is stopped and the engine output shaft 40 is stopped in an approximately stable state, and the relationship between the engine cam torque $T_{EC}$ and the crank angle $\theta_C$ of FIG. 3 can be applied. The relationship of FIG. 3 is stored in the cam torque relationship file 72 of the storage apparatus 70.

The control apparatus 60 acquires the crank angle 52 through the crank angle detection means, searches the cam torque relationship file 72 using the acquired crank angle 52 as a search key, and determines whether or not the crank angle 52 is within an angle range of the positive rotation direction tendency (S20).

When the determination of S20 is positive, the pressing torque in the negative rotation direction is applied from the first rotary electric machine 16 to the gear train, to suppress positive rotation of the engine output shaft 40 (S24). In FIG. 3, the pressing torque 90 of the first rotary electric machine 16 is $-T_P$ which is the pressing torque in the negative rotation direction. When the determination of S20 is negative, because the crank angle 52 is in the angle range of the negative rotation direction tendency, the pressing torque in the positive rotation direction is applied from the first rotary electric machine 16 to the gear train, to suppress negative rotation of the engine output shaft 40 (S22). In FIG. 3, the pressing torque 92 of the first rotary electric machine 16 is $+T_P$ which is the pressing torque in the positive rotation direction. These processing steps are executed by functions of the pressing torque setting unit 66 and the pressing processor 68 of the control apparatus 60.

The pressing torque is set at a size which is greater than a fluctuation range of the torque of the first rotary electric machine 16 and not exceeding the frictional torque of the engine 14 when the direction of the engine cam torque is reversed and the engine cam torque is added. As an example, as the pressing torque in the positive rotation direction, $+T_P$ may be set to +2 Nm~+4 Nm, and as the pressing torque in the negative rotation direction, $-T_P$ may be set to −2 Nm~−4 Nm.

Figure 7A:
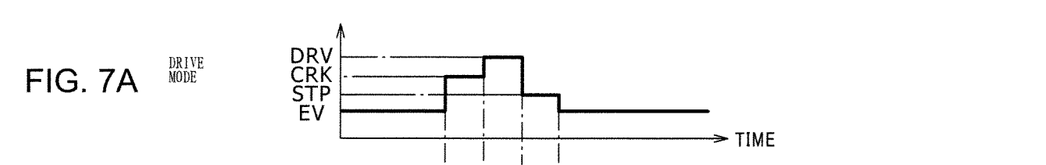
FIG. 7A is a diagram showing the procedure of FIG. 4 as a timing chart of a change of a state of each element, and shows a change with respect to time of a drive mode.
Figure 7B:
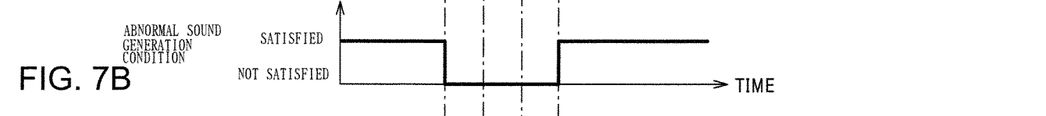
FIG. 7B is a diagram showing the procedure of FIG. 4 as a timing chart of a change of a state of each element, and shows a change with respect to time of an abnormal sound generation condition.
Figure 7C:
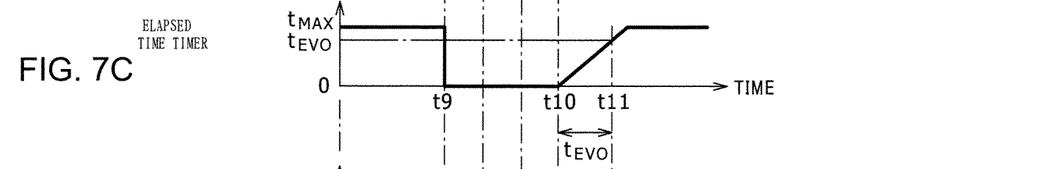
FIG. 7C is a diagram showing the procedure of FIG. 4 as a timing chart of a change of state of each element, and shows an elapsed time from a time when an abnormal sound generation condition is satisfied.
Figure 7D:
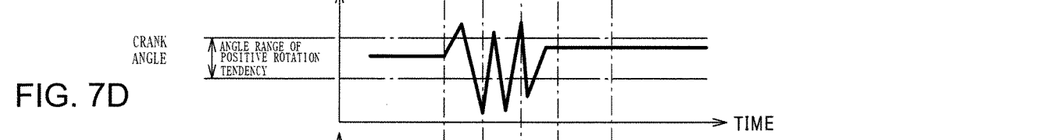
FIG. 7D is a diagram showing the procedure of FIG. 4 as a timing chart of a change of a state of each element, and shows a change with respect to time of a crank angle.
Figure 7E:
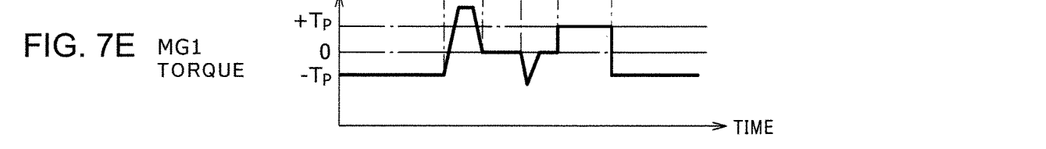
FIG. 7E is a diagram showing the procedure of FIG. 4 as a timing chart of a change of a state of each element, and shows a change with respect to time of an MG1 torque which is an output torque of a first rotary electric machine.

FIGS. 7A-7E are diagrams showing the procedure of FIG. 4 as timing charts of the elements. Horizontal axes of FIGS. 7A-7E represent time. Vertical axes of FIGS. 7A-7E represent, from top to bottom, the drive mode (FIG. 7A), the abnormal sound generation condition (FIG. 7B), the elapsed time timer (FIG. 7C), the crank angle (FIG. 7D), and a state of the MG1 torque which is the output torque of the first rotary electric machine (FIG. 7E).

In a period from time t=0 to time t9, the drive mode is the EV mode (FIG. 7A), the engine 14 is stopped, the hybrid vehicle 10 travels solely using the second rotary electric machine 18, the torque is being generated, and the vehicle velocity is lower than or equal to the predetermined velocity. Thus, the four state determinations of the abnormal sound generation condition all result in positive, and it is determined that "the abnormal sound generation condition is satisfied" (FIG. 7B). The elapsed time timer (FIG. 7C) is a timer that starts measurement when the drive mode becomes the EV mode. Because the mode is constantly the EV mode from time t=0 to time t9, the measurement of the elapsed time timer is stopped at a maximum value of $t_{MAX}$. Therefore, the determination in S18 of FIG. 4 is positive, and the crank angle (FIG. 7D) is in the angle range of the positive rotation direction tendency. Thus, the determination in S20 of FIG. 4 is also positive, and the first rotary electric machine 16 applies $-T_P$ as the pressing torque in the negative rotation direction to the gear train (FIG. 7E).

In a period from time t9 to time t10, the engine 14 is started up (CRK), the vehicle is set to the traveling state using the engine 14 (DRV), and then the engine 14 is stopped (STP). Thus, the drive mode (FIG. 7A) is not the EV mode, and is any one of the CRK mode, the DRV mode, and the STP mode, which are operation modes of the engine 14. Therefore, at least one of the four state determinations of the abnormal sound generation condition results in negative, and it is determined that "the abnormal sound generation condition is not satisfied" (FIG. 7B). The elapsed time timer (FIG. 7C) is reset at time t9 when the vehicle enters the drive mode of the engine 14. The crank angle (FIG. 7D) and the output torque of the first rotary electric machine 16 (FIG. 7E) change according to the operation mode of the engine 14. Here, there is the operation sound of the engine 14, and "the abnormal sound generation condition is not satisfied" (FIG. 7B). Therefore, the output of the first rotary electric machine 16 is set to pressing torque=0 (Nm), and the pressing torque is not applied from the first rotary electric machine 16 to the gear train.

At time t10, the operation mode of the engine 14 is completed, and the drive mode (FIG. 7A) becomes the EV mode. At this time, the engine 14 is stopped and the hybrid vehicle 10 travels solely using the second rotary electric machine 18, the torque is being generated, and the vehicle velocity is lower than or equal to the predetermined velocity. Therefore, all four state determinations of the abnormal sound generation condition result in positive, and it is determined that "the abnormal sound generation condition is satisfied" (FIG. 7B). The elapsed time timer (FIG. 7C) starts measurement from t10 when the drive mode becomes the EV mode, the measurement progresses as the time elapses in the EV mode, and at time t11, the elapsed time becomes the predetermined value $t_{EV0}$.

Thus, in a period from time t10 to time t11, the determination of S18 of FIG. 4 results in negative, and regardless of the crank angle (FIG. 7D), $+T_P$ is applied as the pressing torque in the positive rotation direction from the first rotary electric machine 16 to the gear train (FIG. 7E).

When the elapsed time exceeds t11, the determination of S18 of FIG. 4 becomes positive, and because the crank angle (FIG. 7D) is in the angle range of the positive rotation direction tendency, the determination of S20 of FIG. 4 results in positive. The first rotary electric machine 16 (FIG. 7E) outputs $-T_P$ as the pressing torque in the negative rotation direction.

In the above description, the crank angle in the state where the engine 14 is stopped and stabilized is in the angle range of the positive rotation direction tendency. However, this is merely exemplary for the purpose of the description, and alternatively, the crank angle when the engine 14 is stopped and stabilized may be in the angle range of the negative rotation direction tendency.

In this manner, when the abnormal sound generation condition is satisfied, the pressing torque for reducing rattling is applied from the first rotary electric machine 16 to the gear train of the transmission mechanism, and when the abnormal sound generation condition is not satisfied, the pressing torque is not applied. The pressing torque applied by the first rotary electric machine is set to a torque in a direction to suppress the engine cam torque which may rotate the engine output shaft 40 during a period in which the engine is stopped.

Specifically, when the crank angle during the period in which the engine is stopped is in the angle range of the positive rotation direction tendency, $-T_P$ is applied as the pressing torque in a direction to rotate the engine output shaft 40 in the negative rotation direction, and when the crank angle is in the angle range of the negative rotation direction tendency, $+T_P$ is applied as the pressing torque in a direction to rotate the engine output shaft 40 in the positive rotation direction. With such a configuration, the external force applied to the engine output shaft can be reduced according to the crank angle during the period in which the engine is stopped, and the movement or change of the crank angle of the engine can be suppressed while suppressing generation of the abnormal sound of the gear train.

When the elapsed time from the time when the abnormal sound generation condition is satisfied is within the predetermined value $t_{EV0}$, $+T_P$ is applied as the pressing torque in a direction to rotate the engine output shaft 40 in the positive rotation direction regardless of the crank angle. With such a configuration, even in the transition period immediately after the engine 14 is stopped, the movement or change of the crank angle of the engine can be suppressed while suppressing the generation of the abnormal sound of the gear train.

What is claimed is:

1. A control apparatus of a hybrid vehicle in which an engine, a first rotary electric machine, and a second rotary electric machine are connected to each other through a transmission mechanism including a gear train, the control apparatus configured to:
   determine whether or not a drive condition of the hybrid vehicle satisfies an abnormal sound generation condition of the gear train; and
   execute a pressing process to apply a pressing torque for reducing rattling from the first rotary electric machine to the gear train of the transmission mechanism when the abnormal sound generation condition is satisfied and to not apply the pressing torque when the abnormal sound generation condition is not satisfied, wherein the pressing torque applied by the first rotary electric machine is a torque in a direction to suppress an engine cam torque which rotates an engine output shaft during a period in which the engine is stopped, a relationship between a crank angle of the engine and a direction of the engine cam torque is determined and stored in advance, a pressing torque in a direction to rotate the engine output shaft in a negative rotation direction is applied when the crank angle during the period in which the engine is stopped is in an angle range where the engine output shaft is rotated in a positive rotation direction by the engine cam torque, and a pressing torque in a direction to rotate the engine output shaft in the positive rotation direction is applied when the crank angle during the period in which the engine is stopped is in an angle range where the engine output shaft is rotated in the negative rotation direction by the engine cam torque.

2. The control apparatus of the hybrid vehicle according to claim 1, wherein the pressing torque in the direction to rotate the engine output shaft in the positive rotation direction is applied regardless of the crank angle of the engine when an elapsed time from a time when the abnormal sound generation condition is satisfied is within a predetermined value.

3. The control apparatus of the hybrid vehicle according to claim 2, wherein the abnormal sound generation condition includes:

a condition that a drive mode is an EV mode in which the engine is stopped and the vehicle travels solely using the second rotary electric machine;

a condition that a vehicle velocity of the hybrid vehicle is lower than or equal to a predetermined velocity;

a condition that the hybrid vehicle is traveling and is not stopped; and a condition that a shift position is at a shift position where a torque is output to a drive wheel.

4. The control apparatus of the hybrid vehicle according to claim 3, wherein the vehicle velocity lower than or equal to a predetermined velocity is a vehicle velocity lower than or equal to a predetermined first velocity when the hybrid vehicle is accelerating, and is a vehicle velocity lower than or equal to a predetermined second velocity which is lower than the predetermined first velocity when the hybrid vehicle is decelerating.

5. The control apparatus of the hybrid vehicle according to claim 1, wherein the abnormal sound generation condition includes:

a condition that a drive mode is an EV mode in which the engine is stopped and the vehicle travels solely using the second rotary electric machine;

a condition that a vehicle velocity of the hybrid vehicle is lower than or equal to a predetermined velocity;

a condition that the hybrid vehicle is traveling and is not stopped; and a condition that a shift position is at a shift position in which a torque is output to a drive wheel.

6. The control apparatus of the hybrid vehicle according to claim 5, wherein the vehicle velocity lower than or equal to a predetermined velocity is a vehicle velocity lower than or equal to a predetermined first velocity when the hybrid vehicle is accelerating, and is a vehicle velocity lower than or equal to a predetermined second velocity which is lower than the predetermined first velocity when the hybrid vehicle is decelerating.

7. The control apparatus of the hybrid vehicle according to claim 1, wherein the abnormal sound generation condition includes:

a condition that a drive mode is an EV mode in which the engine is stopped and the vehicle travels solely using the second rotary electric machine;

a condition that a vehicle velocity of the hybrid vehicle is lower than or equal to a predetermined velocity;

a condition that the hybrid vehicle is traveling and is not stopped; and a condition that a shift position is at a shift position in which a torque is output to a drive wheel.

8. The control apparatus of the hybrid vehicle according to claim 7, wherein the vehicle velocity lower than or equal to a predetermined velocity is a vehicle velocity lower than or equal to a predetermined first velocity when the hybrid vehicle is accelerating, and is a vehicle velocity lower than or equal to a predetermined second velocity which is lower than the predetermined first velocity when the hybrid vehicle is decelerating.

* * * * *